(No Model.)
J. O'LOUGHLIN.
CAN SOLDERING MACHINE.
No. 247,268. Patented Sept. 20, 1881.
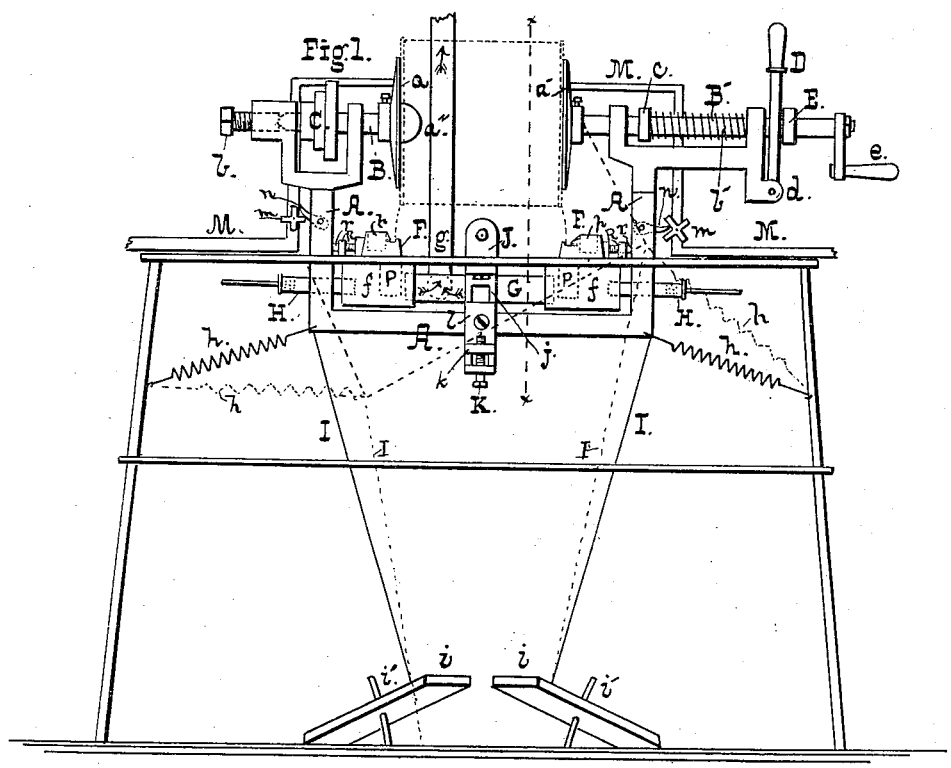
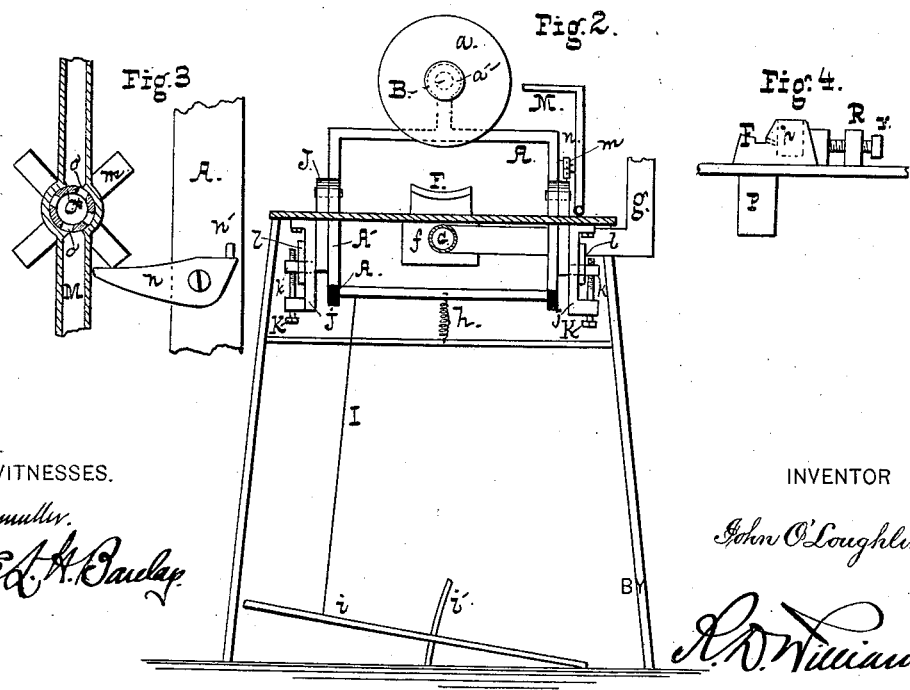
WITNESSES.
INVENTOR
John O'Loughlin
ATTORNEY.

UNITED STATES PATENT OFFICE.

JOHN O'LOUGHLIN, OF BALTIMORE, MARYLAND.

CAN-SOLDERING MACHINE.

SPECIFICATION forming part of Letters Patent No. 247,268, dated September 20, 1881.

Application filed August 8, 1881. (No model.)

*To all whom it may concern:*

Be it known that I, JOHN O'LOUGHLIN, of Baltimore city, State of Maryland, have invented certain new and useful Improvements in Can-Soldering Machines; and I hereby declare the same to be fully, clearly, and exactly described as follows, reference being had to the accompanying drawings, in which—

Figure 1 is a side elevation of the machine. Fig. 2 is an end elevation on the section-line $x$ $x$, Fig. 1. Fig. 3 is an enlarged view, partly in section, of the mechanism for cutting off and delivering a blast of air upon the seam; and Fig. 4 is a side elevation, enlarged, of the iron.

My invention relates to that class of machines designed to effect the soldering of the head-seams of sheet-metal cans, and in particular to that class of said machines in which the can is caused to revolve with its head-seam immersed in a bath of molten solder.

Heretofore in machines of this class the heads were held upon the can-bodies by suitable clamps, which latter were arranged to revolve in bearings upon a frame. The latter was made to tilt, bringing the head-seam down into the solder, in which the can was made to turn, the frame being finally lifted and the can removed to give place to another. The operations of inserting the can between the clamps and removing it therefrom were repeated to attach the other head to the can-body.

The object of my present invention is to obviate this double handling of the cans and solder both heads before the can is removed from the machine. To this end I have devised the machine about to be described, of which the points of novelty are made the subject of the annexed claims.

In the drawings, A is a frame, in the ends of which revolve shafts B B'. The shaft B carries one or more pulleys, C, for a driving-belt in case it is desired to run the machine by power, and is held at a fixed position in its bearings by a set-screw, $b$. On its end is mounted a disk, $a$, smaller in diameter than the can-head, being, by preference, of a size to fit in the conventional countersunk portion of the head. On the center of the disk is a boss, $a''$, designed to fit in the cap-hole of the can and properly center it with its axis in alignment with that of the shaft B.

Instead of a boss I may use a series of prongs or a simple point or other device for centering the can, which does not extend beyond the rim of the head. This feature, in combination with a machine of this class, I do not here claim, broadly, as it is made the subject of a claim in a separate application for Letters Patent.

A second clamping-disk, $a'$, similar to the disk $a$, except that it is devoid of the boss $a''$, is mounted on the shaft B', which latter is susceptible of a sliding motion in its bearings, being impelled toward the shaft B by a spring, $b'$, bearing on a collar, $c$. On the end of the shaft is a crank, $e$, for turning the can by hand.

D is a lever, pivoted to the frame at $d$, and adapted to engage with a collar, E, to retract the shaft B'.

From the sides of the frame A extend upward the bars A', which are pivoted to lugs J just above the table, the bars A, lugs J, and the end bars of the frame passing through suitable slots in the table. Braces $j$ are bolted to the under side of the table on either side of the frame A, and through lugs at their bases pass set-screws K, which engage with lugs $k$ on the slides $l$, which latter are bolted to the lugs J.

It will be understood that upon turning the screws the pivotal points of the frame A are raised or lowered.

The frame is maintained normally in a horizontal position by means of springs $h$, which connect its ends with the support. Two treadles, $i$ $i$, through which pass guide-rods $i'$, are pivoted upon the floor, and they are respectively connected with the ends of the frame by wires I, whereby, as the treadle is depressed, the frame is made to rock on its pivots, being returned to its normal position by the spring as the pressure upon the treadle is released.

F F are the soldering-irons, having a curved and flanged soldering-face, a well, $p$, for the solder, and a projection, P, below the table for the impact of the flame from the burner H. The irons are made adjustable to or from each other by means of screws $r$ passing into the irons and through lugs R upon the table. The lower projecting portions of the irons are inclosed in casings $f$, which are connected by a flue, G, from which a pipe, $g$, for the products of combustion leads to the side of the machine.

At either end of the machine is a pipe, M, leading from a reservoir containing compressed air, or from a suitable air-blast apparatus, and opening opposite the head-seams of the can. In the pipes M are four-way cocks O, having ports o and four arms, m, on their shafts. On either end of the frame A is a pawl, n, and stop n', adapted to partially turn the cocks as the ends of the frame ascend.

In operation, the solder wells and irons are supplied with solder, which is melted by the burners H. The headed cans are successively brought between the disks a a', the disk a' being retracted by the lever D, and the boss a'' being made to enter the cap-holes of the cans. When a can has thus been properly centered between the disks the lever D is released and the disk a' advances, clamping the can. One of the treadles i is then depressed, tilting the frame, and bringing the head-seam of the can down in the solder-bath, where it is revolved by turning the crank e, or by a belt upon one of the pulleys C. The treadle is then released, when the end of the frame rises, and in so doing its pawl n strikes one of the arms m of the cock O, turning the latter, and allowing a blast of air to flow through the pipe M and impinge upon the soldered seam, whereby the solder is quickly cooled and set. The continued upward movement of the pawl closes the cock about the time the frame reaches a horizontal position. The other treadle is then depressed, tilting the opposite end of the can downward and into contact with the soldering-iron, securing the other head-seam in the manner just described. The clamps are finally separated, releasing the can, and the operation is repeated upon the next.

The cooling-blast delivered through the nozzles of the air-pipes M secures most important results in point of efficiency of work and economy of time. In machines of this class it has heretofore been necessary to revolve the can for several seconds after its seam leaves the solder-bath in order to allow the solder to cool and set evenly, as, if the revolution be stopped before the solder sets, it will run down to the lowest point of the can-edge and form a ragged edge. By my device, however, the solder is fully set as the can rises from the bath, and by the time the frame reaches a horizontal position. By this time the pawl passes clear of the arm m, with which it was in engagement, and the blast is cut off. On the descent of the ends of the frame the pawls freely tilt upward, so as to pass the arms m, whereby the blast is only delivered as the can ends rise from the bath, and is cut off when the frame is horizontal.

So far as the cooling is concerned, the blast might be continuous; but in that case it would be objectionable, as liable to blow away the rosin, which is used as a flux, and is applied to the cans in the form of a fine powder. I do not, however, limit myself to the use of an intermittent blast, nor, in case it be made intermittent, need the cocks be automatically operated. The left hand of the operator is free (or, indeed, both hands if the device is run by power) pending the rise of the can from the solder-bath, and the cocks may be operated by hand.

The disks are made removable from the shafts in order to replace them by other disks when it is desired to solder a different size or style of can, and the frame is made vertically and the irons laterally adjustable to accommodate various sizes of can.

Instead of locating the pivots below the can, they may be opposite or above the same, in which latter case the arcs described by the edges of the can-heads as the frame is tilted may be made to intersect above the table, and a single solder-well may be made to supply both irons.

What I claim is—

1. In a can-soldering machine, a revolving can-holder mounted in a tilting frame, in combination with a soldering device and a blast mechanism actuated by the tilting frame to deliver a blast of air upon the seam as the soldering operation is completed, as set forth.

2. In a can-soldering machine, a tilting frame carrying a revolving can-holder, in combination with a pair of solder-baths and a pair of blast-pipes located opposite the can and adapted to cool and set the solder as the can rises from the bath, as set forth.

3. In a can-soldering machine, a tilting frame carrying a pair of shafts having terminal disks smaller in diameter than the can-heads, in combination with a pair of solder-baths into which the head-seams may be tilted, as set forth.

4. In a can-soldering machine, a tilting frame having a revolving can-holder adapted to immerse the head-seams in molten solder, and a blast mechanism operated, as described, by the tilting of the frame, to deliver and cut off a blast of air.

5. In a can-soldering machine, a pair of shafts in alignment, having a clamping device for centering the can, as set forth; a pair of soldering-irons, and mechanism for bringing the can-heads *seriatim* into contact with the irons without removing the can from the machine, substantially as described.

6. In a can-soldering machine, a tilting can-clamp, a pair of soldering-irons so placed as to receive the can-seams as the clamp is tilted, and a blast mechanism arranged to deliver a current of air upon the seams as they rise from the irons, as set forth.

7. In a can-soldering machine, a tilting frame provided with can-supports and having a pawl, in combination with a blast mechanism provided with a cock, and a soldering mechanism, whereby subsequent to the soldering of the seam a blast of air is automatically delivered upon the seam, as described.

8. In combination with the tilting frame having a pair of disks smaller in diameter than the can-heads, a pair of soldering-irons arranged to receive the head-seams as the frame is tilted, as set forth.

JOHN O'LOUGHLIN.

Witnesses:
R. D. WILLIAMS,
JNO. T. MADDOX.